United States Patent
DeFelice et al.

(10) Patent No.: US 11,557,952 B2
(45) Date of Patent: Jan. 17, 2023

(54) TORQUE MOTOR HOUSING

(71) Applicant: HAMILTON SUNDSTRAND CORPORATION, Charlotte, NC (US)

(72) Inventors: Robert DeFelice, South Windsor, CT (US); David J. Zawilinski, W. Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 625 days.

(21) Appl. No.: 16/598,535

(22) Filed: Oct. 10, 2019

(65) Prior Publication Data
US 2021/0111616 A1 Apr. 15, 2021

(51) Int. Cl.
| | |
|---|---|
| H02K 33/02 | (2006.01) |
| F16F 1/373 | (2006.01) |
| H02K 5/24 | (2006.01) |
| H01F 7/14 | (2006.01) |
| F16F 15/08 | (2006.01) |
| H02K 26/00 | (2006.01) |

(52) U.S. Cl.
CPC .......... *H02K 33/02* (2013.01); *F16F 1/3732* (2013.01); *H01F 7/145* (2013.01); *H02K 5/24* (2013.01); *F16F 15/08* (2013.01); *F16F 2224/025* (2013.01); *F16F 2226/04* (2013.01); *H02K 26/00* (2013.01)

(58) Field of Classification Search
CPC .......... H02K 26/00; H02K 5/24; H02K 33/02; F16F 1/3732; F16F 15/08; F16F 2224/025; F16F 2226/04; F16K 31/42; H01F 7/1615; H01F 7/145; H01F 7/122
See application file for complete search history.

(56) References Cited

U.S. PATENT DOCUMENTS

| | | | | |
|---|---|---|---|---|
| 3,639,871 | A | 2/1972 | Trbovich et al. | |
| 4,458,228 | A | 7/1984 | Baumgartner | |
| 4,742,322 | A | 5/1988 | Johnson et al. | |
| 6,677,693 | B2 * | 1/2004 | Ooyama | H02K 23/66 310/239 |
| 7,987,952 | B2 * | 8/2011 | Phan | H02K 5/15 188/158 |
| 8,907,753 | B2 | 12/2014 | Willburger et al. | |
| 9,472,989 | B2 | 10/2016 | Du et al. | |
| 10,498,188 | B2 * | 12/2019 | Jung | H02K 5/24 |
| 2007/0103010 | A1 * | 5/2007 | Kouzu | H02K 5/24 310/51 |
| 2009/0126184 | A1 * | 5/2009 | Smith | H02K 3/44 29/597 |
| 2013/0082552 | A1 | 4/2013 | Shoji | |
| 2021/0194302 | A1 * | 6/2021 | Purchase | H02K 7/14 |
| 2022/0052578 | A1 * | 2/2022 | Cross | H02K 1/30 |

OTHER PUBLICATIONS

The Extended European Search Report for European Patent Application No. 19216003.4 dated Jun. 30, 2020.

* cited by examiner

*Primary Examiner* — Anita M King
(74) *Attorney, Agent, or Firm* — Carlson, Gaskey & Olds, P.C.

(57) ABSTRACT

A torque motor assembly includes a shell which has a first wall and a second wall which defines a cavity. A torque motor is positioned at least partially within the cavity. At least one compliant pad is positioned between the first wall and the torque motor and is configured to trap at least one wire within the shell. A housing for a torque motor and a method of assembling a torque motor assembly are also disclosed.

18 Claims, 2 Drawing Sheets

TORQUE MOTOR HOUSING

BACKGROUND

Torque motors can be used to actuate various components of a gas turbine engine, such as valves. Torque motors are particularly well-suited for operating valves because they can provide servo control, resulting in smooth variations of fluid flow/pressure in response to an input. An example valve is a pneumatic valve, which requires control of a muscle pressure into a chamber to actuate the valve. Also, the electric current required to operate a torque motor is generally very low, on the order of 10 to 150 milliamperes. Torque motors include multiple wires which carry the electric current to operate the motor and provide actuation of the valve.

Gas turbine engines create vibrations during operation. Accordingly, the torque motors situated inside a gas turbine engine, and their wires, are subject to these vibrations.

SUMMARY

A torque motor assembly according to an example of this disclosure includes a shell which has a first wall and a second wall which defines a cavity. A torque motor is positioned at least partially within the cavity. At least one compliant pad is positioned between the first wall and the torque motor and is configured to trap at least one wire within the shell.

In a further example of the foregoing, at least one wire includes a solder joint.

In a further example of any of the foregoing, at least one compliant pad is configured to damp vibratory loads.

In a further example of any of the foregoing, at least one compliant pad is inert with respect the at least one wire.

In a further example of any of the foregoing, at least one compliant pad is formed from a rubber sponge material.

In a further example of any of the foregoing, at least one complaint pad is a first pad, and includes a second pad.

In a further example of any of the foregoing, the first pad is annular in shape. The second pad has a central opening that is configured to receive at least one wire therethrough.

In a further example of any of the foregoing, the first pad includes at least one slot which is configured to receive the at least one wire.

In a further example of any of the foregoing, the second pad is annular in shape. A slot of the at least one slot extends across the radial extent of the second pad, and is configured to receive the at least one wire from a central opening of the second pad.

In a further example of any of the foregoing, the second pad is annular in shape. A slot of the at least one slot extends across a circumferential extent of the second pad, and is configured to receive the at least one wire from a central opening of the second pad.

In a further example of any of the foregoing, at least one wire includes a solder joint.

A housing for a torque motor according to an example of this disclosure includes a shell. The shell has a first wall and a second wall which defines a cavity that is configured to receive a torque motor. A first pad is arranged within the shell and adjacent the first wall, and a second, complaint pad is arranged adjacent the first pad. The first and second pads are configured to trap at least one wire therebetween.

In a further example of the foregoing, the second complaint pad provides the damping of vibratory loads.

In a further example of any of the foregoing, the second complaint pad is inert with respect to the at least one wire.

In a further example of any of the foregoing, the second complaint pad is formed from a rubber sponge material.

In a further example of any of the foregoing, the second complaint pad is annular in shape. The second pad has a central opening which is configured to receive the at least one wire therethrough.

In a further example of any of the foregoing, the second complaint pad includes at least one slot which is configured to receive the at least one wire.

A method of assembling a torque motor assembly according to an example of this disclosure includes inserting a first pad into a shell adjacent a top wall of the shell, routing at least one wire through a central opening in a second compliant pad, inserting the second pad into the shell adjacent the first pad such that the at least one wire is trapped between the first and second pads, and inserting a torque motor into the shell adjacent the second pad.

In a further example of the foregoing, the second pad provided is configured to damp vibratory loads.

In a further example of any of the foregoing, at least one wire includes a solder joint.

DETAILED DESCRIPTION

Figure 1A:
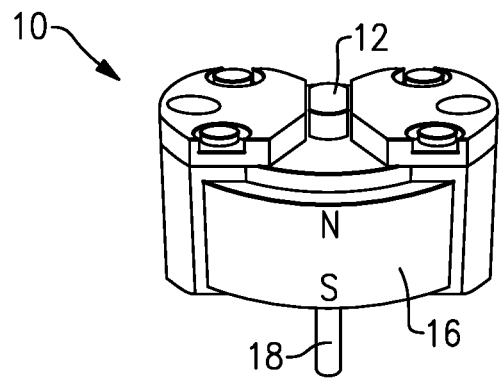
FIGS. 1A-B show an example dual single torque motor.
Figure 1B:
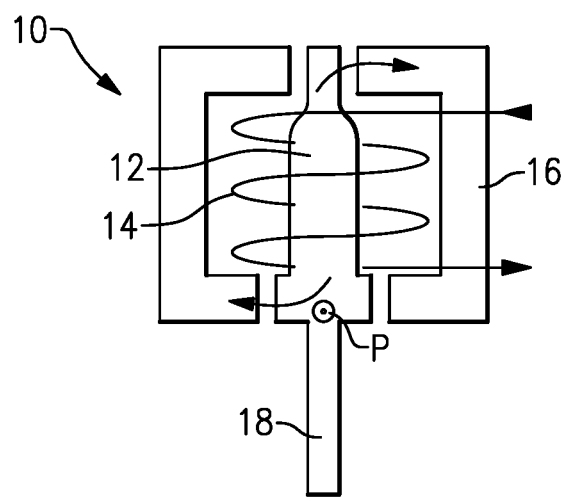

FIGS. 1A-B show an example single coil torque motor 10. The single coil torque motor 10 includes an armature 12 and a coil 14 (e.g., wire 14) wrapped around the armature 12. The armature 12 and coil 14 are inside a magnet 16. A DC current is applied to the coil 14, which creates an electromagnetic force that acts on the armature 12. The armature 12 is attached to an actuator 18. In the example shown, the actuator 18 is pivotable about a pivot point P as the armature 12 is displaced by the electromagnetic field and can effect a downstream component. The direction of signal polarity of the DC current determines the direction in which the actuator 18 moves, and the amount of motion of the actuator 18 is proportional to the amount of DC current applied.

Figure 2A:
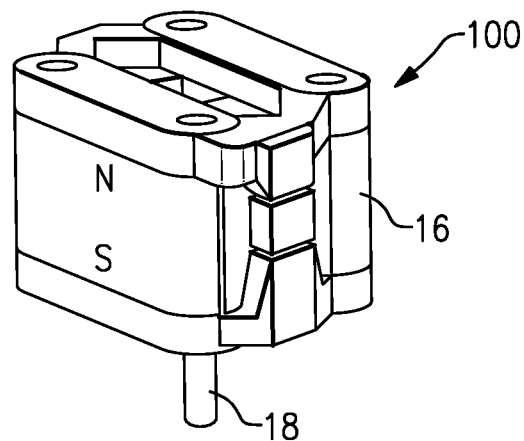
FIG. 2A-B show an example double coil torque motor.
Figure 2B:
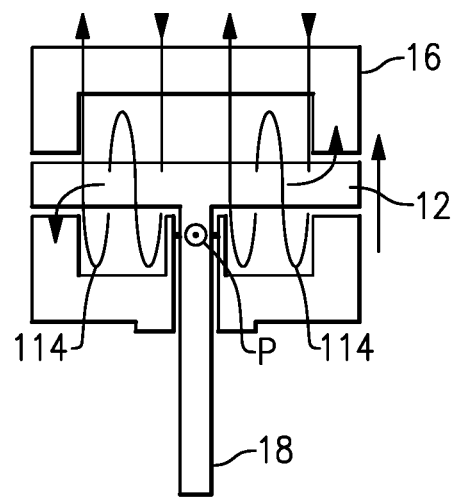

FIGS. 2A-B show an example dual coil torque motor 100. In this example, two coils 14 are wound about an armature 12.

In one example, the downstream component is a valve, such as a pneumatic valve (not shown). In the case of a pneumatic valve, the actuator 18 controls pressure in a chamber, for instance, by opening the chamber to allow fluid to enter it. The pressure in the chamber in turn effects actuation of the valve.

Torque motors 10 can be used to provide servo control of valves such as pneumatic valves in an engine, such as a gas turbine engine. Engines can generate high vibratory loads during normal operation. The vibratory loads are experienced by the coil or coils 14 in the torque motor 10. The torque motor may include other wires that carry a DC current from a source to the coils 14, which will be discussed in more detail below. These wires may have one or more solder points to each other or to other components of the torque motor 10/100, which is also discussed in detail below. The wires and/or solder points can be damaged or broken by vibratory loads, resulting in loss of the DC current carrying function and inoperability of the torque motor 10/100. The wires may also be jostled out of place by the vibratory loads and disconnected the connection points, which can also cause inoperability of the torque motor 10/100 in the same way.

Figure 3:
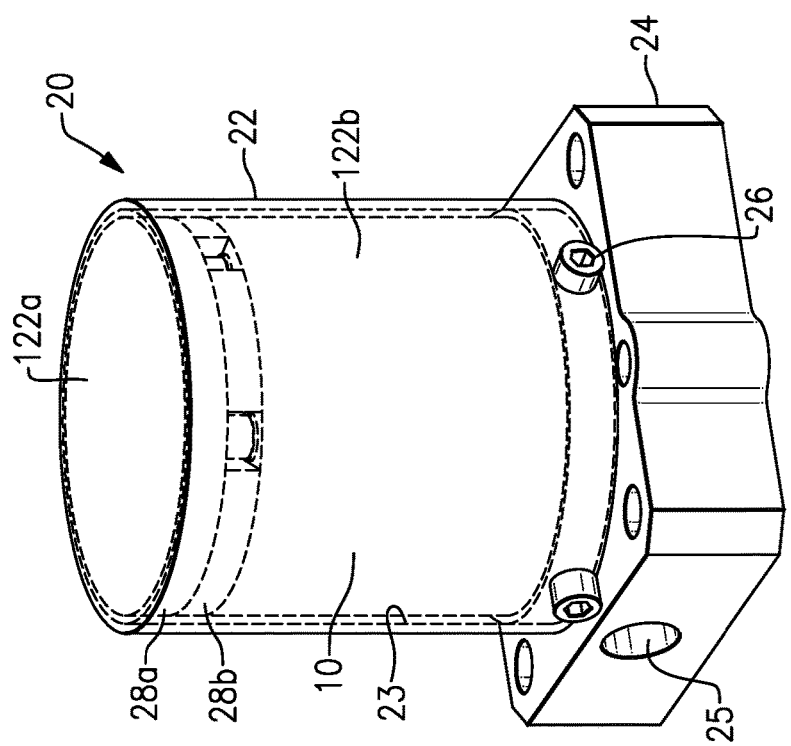
FIG. 3 shows an example torque motor in a housing.

FIG. 3 shows an example housing 20 for a torque motor 10/100. The housing 20 includes a shell 22 which is configured to receive the torque motor 10/100 in a cavity 23. The shell 22 is generally cylindrical and includes a top wall 122a and side wall 122b, though other shapes are contemplated. In the example shown, the torque motor 10/100 includes a base 24. The base 24 can be mounted to a component in a gas turbine engine to secure the torque motor 10/100 in the gas turbine engine by mounting features 25. The shell 22 is secured to the torque motor 10/100 by fasteners 26 at the base 24 or at another part of the torque motor 10/100.

At least one pad is received in the shell 22. The at least one pad is configured to trap wires in the shell 22, as will be discussed in detail below.

In this example, the at least one pad includes a proximal pad 28a and a distal pad 28b. The distal pad 28a is adjacent an interior surface of the top wall 122a. The proximal pad 28b is adjacent the torque motor 10/100, between the distal pad 28b and the torque motor 10/100. The pads 28a/28b fit into and fill tolerance space in the cavity 23, without causing deformation of the shell 22. The pads 28a/28b are thus tightly received against each other, against the torque motor 10/100, and against the shell 22.

In this example, the at least one proximal pad 28 includes a proximal pad 28b and a distal pad 28b. The distal pad 28a is adjacent an interior surface of the top wall 122a. The proximal pad 28b is adjacent the torque motor 10/100, between the distal pad 28a and the torque motor 10/100. The pads 28a/28b fit into and fill tolerance space in the cavity 23, without causing deformation of the shell 22. The pads 28a/28b are thus tightly received against each other, against the torque motor 10/100, and against the shell 22.

The distal pad 28a may comprise the same or different material as the proximal pad 28b. In one example, the proximal pad 28b comprises a more compliant material than the distal pad 28a.

Figure 4A:
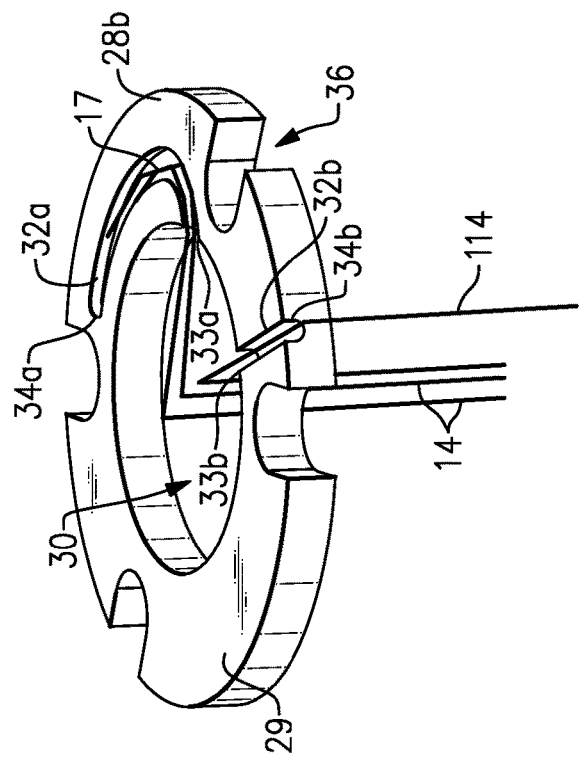
FIGS. 4A-B show example pads for the torque motor housing.

FIG. 4A shows an example proximal pad 28b with wires 14, 114. In this example, wires 14 are coil wires and include a solder joint 17. Wire 114 is an additional wire that carries DC current to the coil wires 14, though other wires as would be known for a torque motor 10/100 are contemplated. The proximal pad 28b is generally annular in shape and includes a central opening 30 which can receive wires 14/114.

In the example of FIG. 4A, the proximal pad 28b includes one or more slots 32 which are configured to receive wires 14/114 and solder joint 17. The slots are formed on an outward-facing surface 29 of the proximal pad 28b, e.g., the surface that is adjacent the distal pad 28a (FIG. 2). The slots can be milled or formed by any known machining method. The distal pad 28a encloses the top, open side of the slots. In this way, the slots hold the wires 14/114 and/or solder joint 17 in place and protects the wires 14/114 and/or solder joint 17 from vibratory loads, such as those generated in a gas turbine engine, by providing damping.

In this example, there are two slots 32a/32b, though more or less slots could be used depending on the wiring of the torque motor 10/100. A first slot 32a has an arcuate shape that opens to the central opening 30 at an entrance point 33a and follows along the circumference of the proximal pad 28b until a termination point 34a. The first slot 32a receives the wires 14 and solder joint 17 from the central opening 30 at the entrance point 33a. The second slot 32b extends in a radial direction across the proximal pad 28b from an entrance point 33b that opens into the central opening 30 to a termination point 34b. The second slot 32b receives wire 114 from the central opening and routes it to an outer surface of the torque motor 10/100, between the torque motor 10/100 and the shell 22.

Figure 4B:
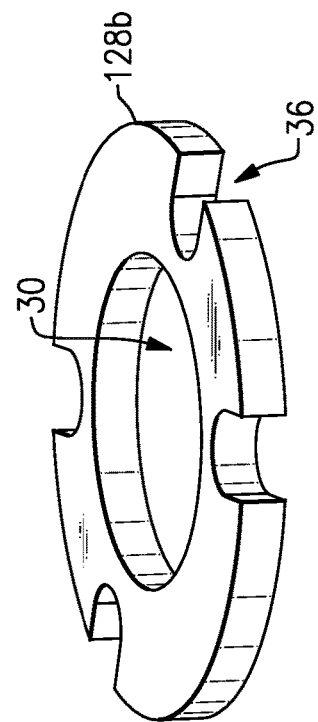

FIG. 4B shows another example proximal pad 128b along with wires 14, 114. In the example of FIG. 4B, the proximal pad 128b does not include any slots. In this example, the wires 14/114 and/or solder joint 17 are tightly trapped or sandwiched between the proximal pad 128b and the distal pad 28a, which holds the wires 14/114 and/or solder joint 17 in place and protects the wires 14/114 and/or solder joint 17 from vibratory loads, such as those generated in a gas turbine engine, by providing damping.

The proximal pad 28b/128b may also include one or more openings 36 which are configured to accommodate grommets, bolts, or other components of the torque motor 10/100, which ensures a tight fit for the pads 28a/28b/128b in the shell 22.

Although the different examples are illustrated as having specific components, the examples of this disclosure are not limited to those particular combinations. It is possible to use some of the components or features from any of the embodiments in combination with features or components from any of the other embodiments.

The distal pad 28a is inserted into the shell 22 prior to fitting of the torque motor 10/100 into the housing 20. In one example, the distal pad 28a is attached to the top wall 122a of the shell 22 by an adhesive of another method. Wires 14/114 can then be routed through the central opening 30 of the proximal pad 28b/128b, and then the wires 14/114 are trapped in between the pads 28a and 28b/128b as the proximal pad 28b/128b is inserted adjacent the distal pad 28a. The torque motor 10/100 is then inserted into the shell 22, and secured to the shell 22.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A torque motor assembly, comprising:
   a shell having a first wall and a second wall defining a cavity;
   a torque motor positioned at least partially within the cavity;
   at least one compliant pad positioned between the first wall and the torque motor and configured to trap at least one wire within the shell, wherein the at least one compliant pad is configured to be inert with respect to the at least one wire.

2. The assembly of claim 1, wherein the at least one wire includes a solder joint.

3. The assembly of claim 1, wherein the at least one compliant pad is configured to damp vibratory loads.

4. The assembly of claim 1, wherein the at least one compliant pad is formed from a rubber sponge material.

5. The assembly of claim 1, wherein at least one complaint pad is a first pad, and further comprising a second pad.

6. The assembly of claim 5, wherein the first pad is annular in shape, wherein the second pad has a central opening configured to receive the at least one wire therethrough.

7. The assembly of claim 5, wherein the first pad includes at least one slot configured to receive the at least one wire.

8. The assembly of claim 7, wherein the second pad is annular in shape, and wherein a slot of the at least one slot extends across the radial extent of the second pad, and is configured to receive the at least one wire from a central opening of the second pad.

9. The assembly of claim 7, wherein the second pad is annular in shape, and wherein a slot of the at least one slot extends across a circumferential extent of the second pad, and is configured to receive the at least one wire from a central opening of the second pad.

10. The assembly of claim 9, wherein the at least one wire includes a solder joint.

11. A housing for a torque motor, comprising:
    a shell, the shell having a first wall and a second wall defining a cavity configured to receive a torque motor; and
    a first pad arranged within the shell and adjacent the first wall, and a second, complaint pad arranged adjacent the first pad, wherein the first and second pads are configured to trap at least one wire therebetween, wherein the second compliant pad is configured to be inert with respect to the at least one wire.

12. The housing of claim 11, wherein the second complaint pad provides damping of vibratory loads.

13. The housing of claim 11, wherein the second complaint pad is formed from a rubber sponge material.

14. The housing of claim 11, wherein the second complaint pad is annular in shape, wherein the second pad has a central opening configured to receive the at least one wire therethrough.

15. The housing of claim 11, wherein the second complaint pad includes at least one slot configured to receive the at least one wire.

16. A method of assembling a torque motor assembly, including:
    inserting a first pad into a shell adjacent a top wall of the shell;
    routing at least one wire through a central opening in a second compliant pad;
    inserting the second pad into the shell adjacent the first pad such that the at least one wire is trapped between the first and second pads; and
    inserting a torque motor into the shell adjacent the second pad.

17. The method of claim 16, wherein the second pad provides is configured to damp vibratory loads.

18. The method of claim 16, wherein the at least one wire includes a solder joint.

* * * * *